Patented Jan. 23, 1940

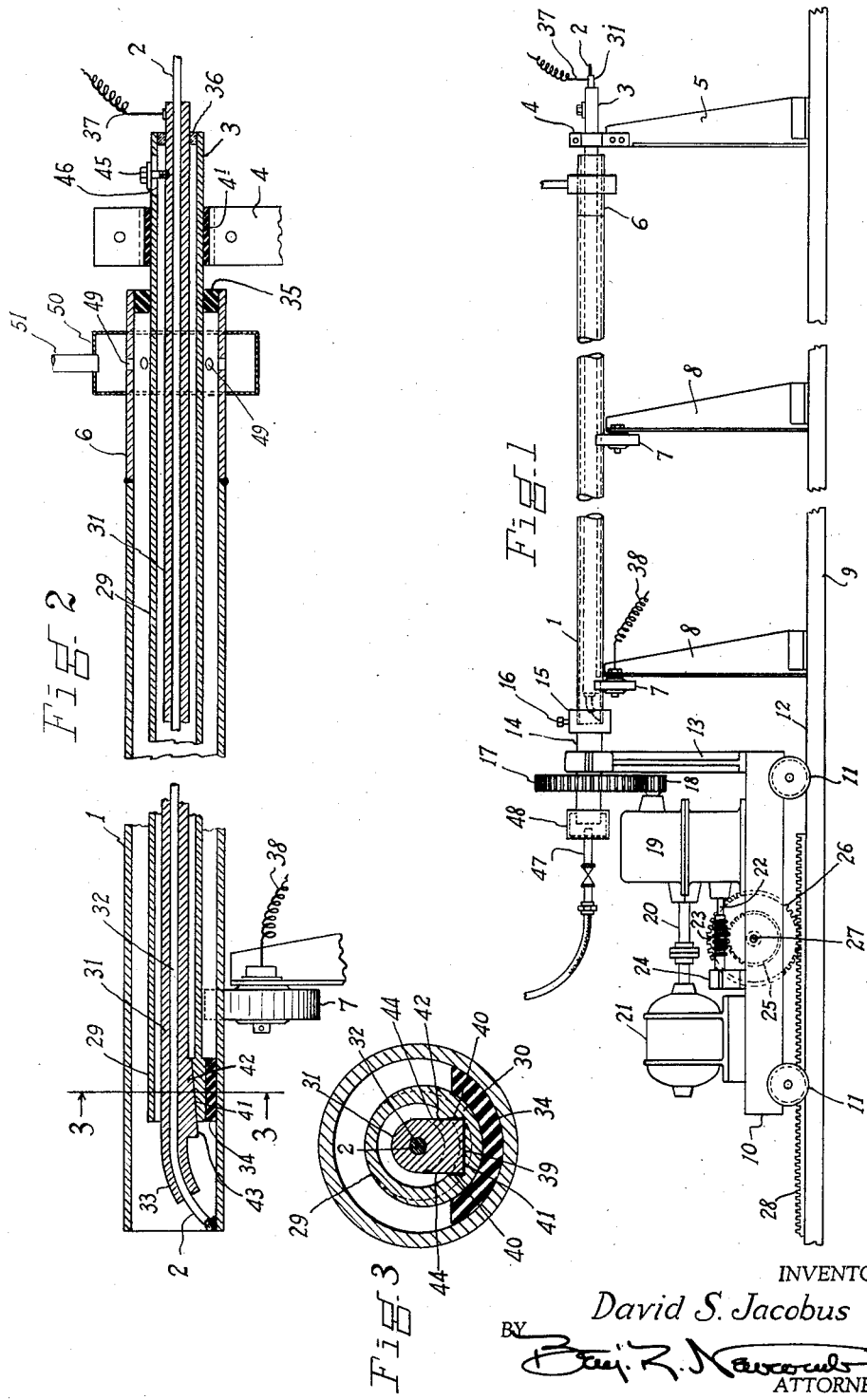

2,187,786

UNITED STATES PATENT OFFICE 2,187,786

FUSION WELDED TREATMENT OF TUBULAR BODIES

David S. Jacobus, Montclair, N. J., assignor to The Babcock & Wilcox Company, Newark, N. J., a corporation of New Jersey Application July 25, 1936, Serial No. 92,544

12 Claims. (Cl. 219—8)

This invention is a development in the treatment of metallic tubes and has particular reference to the application of a metallic coating to the interior surface of a tube wall.

An object of the invention is to provide an integral coating or liner for a metallic tube and which lining is of material highly resistant to corrosion or other deterioration resulting from, for instance, the action of the liquid or gaseous atmosphere to which the tube is exposed.

A further object is the formation of the liner by a continuous welding process, utilizing a weldrod of suitable composition which provides a layer of the desired characteristics integral with the metal of the tube.

Additional objects of my invention include the development of apparatus for applying a fusion welded liner of metal throughout the length and circumference of the tube in an expeditious and economical manner, while insuring uniformity in quality and thickness of the deposit, and proper regulation of arc length and atmosphere to secure a sound deposit of weld metal.

A complete disclosure of the invention is afforded by the following detailed description and the accompanying drawing, in which, Fig. 1 illustrates one type of apparatus for automatically providing a fusion welded deposit of liner metal to the inner wall of a tube, Fig. 2 is a longitudinal section through the tube showing the weldrod and its holder in the operating position, and Fig. 3 is a sectional view along the line 3—3 of Fig. 2 to further illustrate details of the construction.

In the embodiment of my invention as illustrated, a tube 1 and a weldrod 2 are moved relatively to each other in order that a deposit of fused metal may be applied to every part of the internal tube area. The relative movement involves a movement of translation between the tube and weldrod longitudinally, and a rotation of the tube about its central axis, these motions being applied in succession, if desired, or simultaneously as provided for by the specific apparatus herein described.

The weldrod 2 is supported in a holder 3 which is held stationary by a clamp 4 attached to bracket 5. The tube 1, having a tubular extension 6 welded thereto, is supported on rollers 7 mounted in sets on brackets 8 which are positioned at spaced locations along the length of the tube. The brackets 5 and 8 are secured to the base 9, which also forms a track for the travelling carriage 10 by having the wheels 11 on the carriage engage the upper edges 12.

A bracket 13 on the carriage supports the hollow drive shaft 14 having a chuck 15 at one end which is adjustable by means of the screw 16 to grip the end of the tube 1 and cause it to be rotated and also to be moved longitudinally as the carriage 10 rolls along the base 9. A gear wheel 17, also carried by the hollow shaft 14 is driven by the pinion 18 through the reducing gear unit 19 and power shaft 20 from an electric motor 21. A counter-shaft 22 of the gear unit drives the worm 23 which is rotatably mounted in the bearing bracket 24 on the carriage 10 and meshes with the worm wheel 25 mounted concentric with the gear wheel 26 on a shaft 27 which is journalled in the carriage 10. The gear wheel 26 meshes with the rack 28 which is secured to base 9 so that a longitudinal movement is given to the tube at the same time that the tube is being rotated. The gear unit 19 provides a definite ratio between the speed of the power shaft 20 and the speed of pinion 18 as well as between the power shaft and the worm in order that the desired relation will exist between the longitudinal travel of the tube and its speed of rotational movement.

The relative movements thus provided between the tube and the weldrod will cause the fused metal to be deposited on the inner tube surface in a helical path, and by maintaining a proper ratio between longitudinal and rotational speeds of the tube will cause the deposits in successive convolutions to overlap and so provide an uninterrupted liner of uniform thickness.

The weldrod holder 3 includes an outer shell 29 having a thickened wall at 30 at one end, and an inner barrel 31 provided with a central bore 32 for the accommodation and passage of the weldrod 2. One end of the barrel is curved at 33 to direct the end of the weldrod toward the wall of the tube. An insulating block 34 is secured to the shell 29 at its thickened portion and in conjunction with the insulating plug 35 at the opposite end, within the tubular extension 6, keeps the weldrod holder spaced physically and electrically from the tube wall. The space between the shell and barrel is closed at one end by the sealing ring 36. Electrical contact is made to the inner barrel 31 at 37, or, if desired, may be made direct to the weldrod 2 as it is fed to the holder 3. One terminal of the welding circuit is thus connected to the weldrod, and the circuit completed by connecting the tube to the opposite terminal at 38 through one or more of the rollers 7 which are located near the extended end of the weldrod 2 and preferably insulated from the corresponding bracket 8. Clamp 4, which is attached to bracket 5, may also be suitably insulated from the weldrod holder 3 as indicated at 4'.

The inner wall of the shell portion 30 is provided with a channel 39 having parallel sides 40 and a bottom surface 41 inclined to the longitudinal axis of the shell. The inner barrel 31 is provided with a lug 42 having an inclined surface 43 complementary to the inclined surface 41 on the outer barrel, and parallel sides 44 for slidable engagement of the lug with the channel 39 in the shell of the weldrod holder. The inclined surfaces 41 and 43 on the shell and barrel respectively, allow for adjustment of the distance between the weldrod 2 and the work-piece or tube 1, to suit the existing conditions, and the proper setting is maintained by means of the locking bolt 45 operating through a longitudinally extending slot 46 in the shell 29 and engaging the inner barrel 31. A slight adjustment may also be obtained by regulating the distance that the weldrod extends beyond the end of the inner barrel, but the preferred method is to regulate the distance between the weldrod and the tube by means of the inclined surfaces, which affords a wider range of adjustment and does not affect the rigidity of the weldrod extension.

Weldrods of various composition may be selected in the practice of this invention and may be either bare or coated with a suitable flux as desired. A well known alloy having a chromium content of approximately 18% and a nickel content of approximately 8% may be one of many desirable materials for the weldrod, particularly where a liner of non-corrosive properties is required. A certain amount of flexibility is required to permit the weldrod to follow the curvature of the bore 32 of the barrel 31 and be directed at the proper angle toward the tube surface on which the fused metal is to be deposited.

Under certain conditions it may be desirable to maintain a neutral or non-oxidizing atmosphere around the welding zone and for this purpose a gas inlet is provided at 47 communicating with the interior of the tube 1 through a gas housing 48 which is rotatably sealed to the end of the hollow drive shaft 14 at the end opposite the coupling or chuck 15. The gas thus introduced envelops the electric arc, filling the space within the tube and being discharged through openings 49 in the wall of the tubular extension 6, and into the rotatably sealed gas housing 50 provided with outlet connection 51. Various gases will be found suitable for the purpose, the selection being governed generally by such factors as the composition of the weldrod, the tube metal, and the quality of the final deposit required. Hydrogen, for example, is satisfactory for certain conditions although other gases, such as propane, or mixtures of gases, or in fact gaseous vapors, are also available for specific conditions. It is also contemplated that under certain circumstances a flux may be introduced through the inlet 47 to the interior of the tube, in which case a mist or vapor of a suitable liquid provides the desired fluxing action and a deposit of excellent quality is obtained while permitting the use of a bare wire weldrod entirely devoid of flux in its composition.

The deposition of the fused metal is begun with the parts arranged as in Fig. 1 with the weldrod at the extreme left hand end of the tube 1 which is gripped by the chuck 15. The electric motor 20 is started up and tube 1 rotated on the roller supports 7, at the same time being moved longitudinally as the carriage 10 is driven along the rack 28. The welding circuit is closed through the terminals 37 and 38, maintaining an electric arc between the weldrod 2 and the wall of the tube, and causing the fused metal of the weldrod to be deposited and welded in a helical path on the interior of the tube. The weldrod is fed through the holder at a rate which will insure a substantially constant length of extension beyond the barrel 31 and maintain the desired voltage across the arc. The length of the arc may be adjusted, as already described, by shifting the barrel of the weldrod holder lengthwise with respect to the shell and locking the parts at the required setting by means of the bolt 45. As the deposition progresses, the tube 1 may be drawn clear of the right hand set of rollers 7 but still be adequately supported by the rollers provided at other locations along the tube length. The insulating block 34 rides on the inner surface of the tube and maintains the weldrod at the same distance from the tube wall for all positions along the tube. As the tube approaches the extreme position of its travel to the left, the block 34 will be supported by the tubular extension 6 and thus permit the deposit to be completed for the full length of tube 1. The tube may then be removed from the chuck 15 and clear of the weldrod and its holder, after which the extension may be cut off and discarded, or if preferred, welded to another tube for a repetition of the process.

In order to resume operations, the carriage is returned to its original and extreme right hand position as shown in Fig. 1, the return travel being made under electric power, if desired, by reversing the direction of rotation of the motor 21. Numerous devices can be applied to obtain a quick return travel of the carriage, and being well known and available, need not be discussed here in detail.

It may be found advantageous to automatically control various factors in the operation of the device to insure uniformity of quality and thickness of the deposited layer of fused metal. These controls may regulate, for example, the rate at which the weldrod is fed to the work and coordinate this rate of feed with the speed at which the tube is moved relatively to the weldrod. Various adaptations of my invention are possible and contemplated, and it is my intention to include within the scope of the following claims any and all such variations, without restriction except as may be required by the prior art.

I claim:

1. A weldrod holder comprising inner and outer tubular members, means associated with both members for adjusting said members relatively in a direction transversely of their axes, and means whereby a weldrod received by one of the members has an end portion deflected laterally of said member toward a workpiece spaced therefrom.

2. The method of applying a continuous layer of fusing weldrod metal to the entire inner surface of a tube of relatively small diameter and of a given length many times said diameter which comprises, temporarily extending the tube at one end, inserting the weldrod into the tube at its extended end, maintaining an electric welding arc between the weldrod and tube initially remote from the extended end, relatively moving said weldrod and tube to provide simultaneous movements of rotation and translation therebetween, and supporting the weldrod on the interior of said temporary extension during a period of relative movement of said arc adjacent the extended end whereby said welding arc traverses the entire unextended tube length, and subsequently removing said extended portion.

3. Apparatus for lining the inner wall of a tubular member by application of fusion metal thereto, said member being of relatively small diameter and of a length many times its diameter, which includes a weldrod adapted to be positioned within said member, means for maintaining a welding arc between the inner end of said weldrod and the inner wall of said member, means for simultaneously maintaining relative movements of rotation and translation between said weldrod and member, and means for positively maintaining said weldrod in operative welding position relative to said inner wall including weldrod supporting means adapted to engage unlined portions of said wall throughout said relative movements.

4. In combination with a weldrod for applying fusing weldrod metal to the inner wall of a tube, means adapted to hold an extended length of said weldrod within said tube substantially parallel to its axis, mechanism adapted to rotate said tube and to move the tube and weldrod relatively longitudinally, means for excluding gases of oxidizing characteristic from the interior of said tube including means adapted to rotatably seal one end of said tube to said weldrod holding means, and means including an element of said mechanism adapted to connect the opposite end with a source of non-oxidizing gases.

5. In combination with a weldrod, a holder for said weldrod adapted to extend longitudinally within a tube from a point outside, means adapted to move said weldrod holder and said tube relatively, means adapted to maintain a non-oxidizing atmosphere within said tube including means adapted to movably seal one end of said tube to said holder and controllable gas inlet means adapted to connect the opposite end of said tube to a source of gas of reducing character.

6. In combination with a weldrod, a weldrod holder adapted to extend within a tube from a point outside, means maintaining said holder substantially concentric with said tube including means adjacent the inner extended end of said holder adapted to bear against the inner wall of said tube, means adapted to move said weldrod holder and tube relatively, means for controlling the character of atmosphere within said tube including means adapted to movably seal one end of said tube to said holder and means to admit gas to the interior of said tube and to discharge gas therefrom at locations spaced longitudinally of said tube.

7. A weldrod holder comprising inner and outer tubular members, said inner member having a bore extending longitudinally therethrough and curved at one end to deflect and guide the weldrod from its axial direction toward a workpiece at one side thereof, and inclined plane means on said members for adjusting said members relatively in a direction transversely of their axes to control the arcing distance between said weldrod and workpiece.

8. In combination with a weldrod adapted to be positioned within a tube, a weldrod holder having means adapted to support one portion of said weldrod substantially parallel to the tube axis and to guide an end portion thereof toward the inner tube wall, said weldrod holder having means adapted to bear against the tube wall and means adapted to insulate said weldrod from said tube, and inclined plane means intermediate said bearing means and said weldrod supporting and guiding means for adjustment of the distance between the weldrod and tube wall.

9. In combination, a weldrod and a holder therefor adapted to position said weldrod within a tube in substantially parallel relation to the tube axis, said weldrod holder comprising parts relatively movable longitudinally of the tube, one in contact with said weldrod and formed to guide one end of said weldrod toward the inner wall of said tube and another adapted to bear against said wall, said parts being cooperatively formed for adjusting the arcing distance upon relative longitudinal movement of said parts, and means adapted to extend exteriorly of the tube to enable said parts to be moved relatively from the exterior of said tube.

10. In combination, a weldrod and a holder therefor adapted to position said weldrod within a tube in substantially parallel relation to the tube axis, said weldrod holder comprising parts relatively movable longitudinally of the tube, one in contact with said weldrod and formed to guide one end of said weldrod toward the inner wall of said tube and another adapted to bear against said wall, said parts being cooperatively formed for adjusting the arcing distance upon relative longitudinal movement of said parts, and means adapted to extend exteriorly of the tube to enable said parts to be moved relatively and to be locked in the adjusted position from the exterior of said tube.

11. Apparatus for lining the inner wall of a tubular member by application of fusion metal thereto, said member being of relatively small diameter and of a length many times its diameter, which includes a weldrod adapted to be positioned within said member, means for maintaining a welding arc between the inner end of said weldrod and the inner wall of said member, means for simultaneously maintaining relative movements of rotation and translation between said weldrod and member, and a support for guiding said weldrod as it is fed to the arc of such rigidity as to positively control the position of said arc throughout its travel relative to said inner wall, said weldrod support having a portion longitudinally spaced from the arcing end of the guided weldrod adapted to continuously contact the unlined interior surface of said tube in advance of the welding zone throughout said relative movements.

12. Apparatus for applying fusion metal to the inner wall of a tubular member of relatively small diameter and of a length many times its diameter which includes a weldrod adapted to be positioned within said member, means for maintaining a welding arc between the inner end of said weldrod and the inner wall of said member, means for simultaneously maintaining relative movements of rotation and translation between said weldrod and member, and means for positively maintaining said weldrod in operative welding position relative to said inner wall including a guide for said weldrod and a relatively rigid support for said guide substantially coextensive therewith and adapted to engage said wall throughout said relative movements.

DAVID S. JACOBUS.